(12) United States Patent
Nathoo

(10) Patent No.: US 9,064,285 B1
(45) Date of Patent: Jun. 23, 2015

(54) EMPLOYEE PAYROLL INFORMATION MANAGEMENT

(71) Applicant: Square, Inc., San Francisco, CA (US)

(72) Inventor: Amir Nathoo, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 14/334,422

(22) Filed: Jul. 17, 2014

(51) Int. Cl.
  *G06F 15/12* (2006.01)
  *G07C 1/10* (2006.01)
  *G06Q 40/00* (2012.01)
  *G06Q 10/10* (2012.01)

(52) U.S. Cl.
  CPC .......... *G06Q 40/125* (2013.12); *G06Q 10/1053* (2013.01)

(58) Field of Classification Search
  None
  See application file for complete search history.

(56) References Cited

U.S. PATENT DOCUMENTS

2002/0022982 A1* 2/2002 Cooperstone et al. ............ 705/7

\* cited by examiner

*Primary Examiner* — Paul Danneman
(74) *Attorney, Agent, or Firm* — Lee & Hayes, PLLC

(57) ABSTRACT

In some examples, a service provider may provide a payroll service in which an employer is able to obtain employee information from the payroll service for adding a new employee. For instance, the employee may be able to add or change employee information in an employee profile maintained by the service provider. When the employee is hired by a new employer, the new employer may receive the employee information from the employee profile for adding the employee to the new employer's payroll. For example, the employee may provide an employee authorization to authorize the service provider to add the employee information to the payroll information for the new employer. Accordingly, each employer may add the employee to the payroll of the employer without having to manually obtain and enter detailed employee information.

26 Claims, 9 Drawing Sheets

EMPLOYEE PAYROLL INFORMATION MANAGEMENT

BACKGROUND

When an employer hires a new employee, detailed information about the employee is often required to add the new employee to the employer's payroll system. As one example, the employer may manually enter all this information into a form that is then provided to a payroll management service. For employers that frequently hire new employees, entering payroll information for employees can become a tedious task that can consume a considerable amount of the employer's time.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
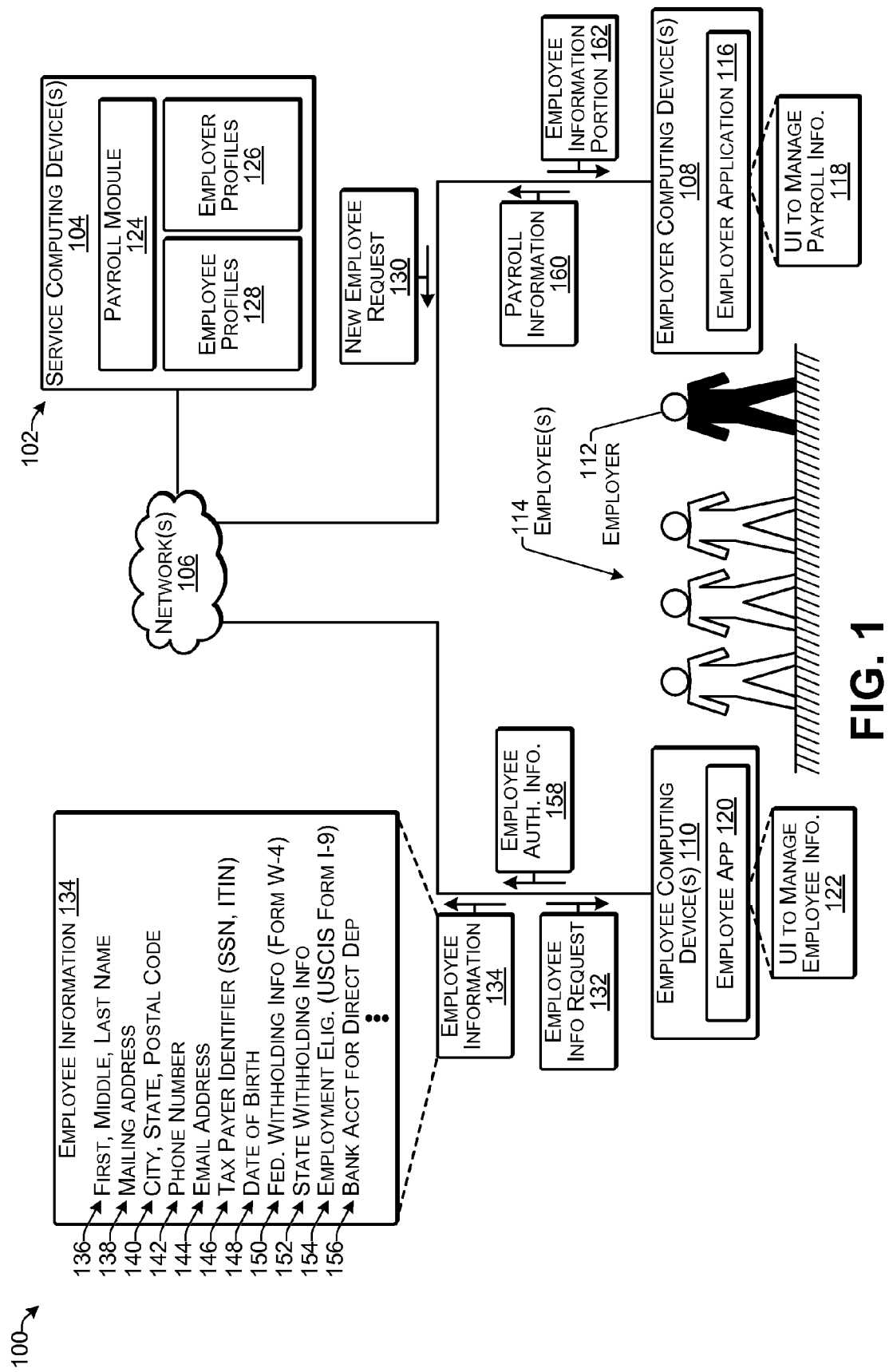
FIG. 1 illustrates an example environment for a payroll service according to some implementations.

Some implementations herein include techniques and arrangements for adding employee information to an employer's payroll in a seamless automated fashion. As one example, when an employer hires a new employee, the employer may send a request to a service provider to request that the new employee be added to the payroll of the employer. In response, the service provider may send an electronic communication to the employee, such as an email, SMS (short message service) text message, or the like, to request that the new employee provide employee information to enable the service provider to add the new employee to the payroll of the employer. For example, the employee information may include a taxpayer identifier such as a Social Security number (SSN) or individual taxpayer identification number (ITIN); federal income tax withholding information, such as information for completing an Internal Revenue Service (IRS) form W-4; state income tax withholding information (if any); information related to a bank account for receiving direct deposit payroll payments, and other information, as enumerated elsewhere herein.

In response to receiving the communication from the service provider, the employee may fill in a plurality fields in a user interface (UI), or may otherwise provide the requested employee information to the service provider. The employee information may be sent to the service provider and the service provider may associate the received employee information with an employee profile corresponding to the new employee. Furthermore, the employee may provide an authorization credential or other authorization information so that access to the employee information in the employee profile may be controlled by the employee. Accordingly, the employee may be able to add to, update, or otherwise change the employee information as desired by accessing the employee profile maintained by the service provider. Any changes subsequently made by the employee may be applied by the service provider to the current payroll information for the current employer's payroll.

In some examples, at least a portion of the employee information may be sent to the employer for verification and/or signature, such as by the employer and/or the employee. For instance, certain government-required forms, such as an IRS W-4 form for employee tax withholding exemptions, and/or a USCIS (United States Customs and Immigration Service) Form I-9 for employee eligibility verification may be provided to the employer in a pre-filled condition, and may just require signature and verification. In other examples, the employer may receive an indication from the service provider that the employee information for the new employee has been received, and the new employee has been added to the employer's payroll.

The employer may further provide payroll information to the service provider, which may include wage information regarding how much the new employee is to be paid (e.g., hourly or salary), how often the new employee will be paid, whether the new employee is eligible for commission or overtime, rules for distributing gratuities, if any, and so forth.

In some examples, when adding a new employee to the payroll, the employer merely sends some basic identifying information, such as name and email address or phone number, to the service provider to enable addition of the new employee to the employer's payroll. The employee may subsequently provide the employee information to the service provider to enable the service provider to add the employee to the payroll. The employee may have full access and control over the employee's own information. The employee can fill in the requested information and may change the information when desired. Further, when the employee takes a new job, an additional job, etc., the employee may use the employee information already provided for the previous job. Thus, the employee does not have to re-enter any employee information unless that information has changed. Additionally, the employer does not have to maintain forms about the employee, maintain information about the employee, or the like. Instead, the service provider maintains the employee's information and enables the employee to manage this information directly, which frees up the employers to run their businesses without being responsible for managing payroll information for each employee.

In some examples, the employer may be a merchant, and the service provider may also provide a payment service to the merchant/employer, and may provide the payroll service in association with providing the payment service. The payment service provided by the service provider may include the provision of software, hardware and/or payment processing services to the merchant to enable the merchant to receive payments from buyers and to otherwise conduct POS transactions with buyers.

Further, the data from the payment service may be used to determine payroll payments for particular employees of the merchant. For example, the payment service may keep track of hours worked by an employee, sales made by an employee, gratuities received by an employee, and so forth. Accordingly, the payroll service may directly receive the information from the payment service to calculate the payroll payment due to particular employees. For example, the payroll service may use the data from the payment service to determine whether the employee is due a sales commission based on the amount of sales made while the employee is logged in to, or otherwise determined to be using a particular merchant device on which identified sales were generated. Further, gratuities may be tracked and distributed according to one or more tip distribution rules provided by the merchant.

For discussion purposes, some example implementations are described in the environment of a service computing device that communicates with an employer computing device and an employee computing device to manage employee information. However, implementations herein are not limited to the particular examples provided, and may be extended to other environments, other system architectures with more or fewer computing devices, other applications, and so forth, as will be apparent to those of skill in the art in light of the disclosure herein.

FIG. 1 illustrates an example environment 100 for a payroll service according to some implementations. For instance, the environment 100 may enable a service provider 102 to provide a payroll service in which employers are able to add new employees to a payroll without having to manually enter a majority of the employee information. For example, one or more service computing devices 104 may be associated with the service provider 102, and may be able to communicate over one or more networks 106 with one or more employer computing devices 108 and one or more employee computing devices 110. In some examples, an individual employer computing device 108 may be associated with a particular employer 112, and an individual employee computing device may be associated with an individual employee 114.

The employer 112 may have a business that employs one or more employees 114. As used herein, an employee 114 may include any individual hired by an employer 112 to perform work in exchange for payroll payments, and may include an individual employed by the employer 112 in the past, an individual presently employed by the employer 112, or an individual to be employed by the employer 112 in the future. Further, in some examples, an employee 114 may include an independent contractor or agent that receives payroll payments from an employer 112. Furthermore, a payroll may include a list of one or more employees 114 of employer 112, and an indication of an amount that each employee 114 is to be paid. In addition, an employer 112 may be any entity that hires employees 114 to perform work and pays the employees 114 from the payroll.

The employer computing device 108 may include an employer application 116 that may present a user interface 118 to enable the employer to, among other things, manage payroll information and employee information. In some examples, the employer application 116 may be a web browser, or the like, that enables the employer to access and manage payroll information via one or more webpages. In other examples, the employer application 116 may be an application, such as a mobile application or desktop application, which is provided by the service provider, or may be an otherwise dedicated application. Further, in some cases, the employer application 116 may also function as, or be able to operate concurrently with, a merchant application to enable the employer or employees of the employer to conduct point of sale transactions, such as for the sale of goods or services (referred to hereinafter as "items").

In addition, the employee computing device may include an employee application 120 that may present a user interface 122 to an employee, such as to enable the employee to provide employee information to the service provider computing device 104. In some examples, the employee application 120 may be a web browser, or the like, that enables the employee to access and manage employee information via one or more webpages or other user interfaces 122. In other examples, the employee application 120 may be an application, such as a mobile application or desktop application, which is provided by the service provider 102, or may be an otherwise dedicated application.

The service computing device 104 may include a payroll module 124 that is able to receive employer information and save the employer information in respective employer profiles 126, such that each employer profile 126 may be associated with a respective employer. In addition, the service computing device 104 may receive employee information, and may save the employee information in respective employee profiles 128, such that each employee profile 128 may be associated with a respective employee.

As one example, suppose that the employer 112 has hired a new employee 114 and wants to add the new employee 114 to the employer's payroll. The employer 112 may send a new employee request 130 to the service computing device 104. For example, the new employee request 130 may include a name or other identifier of the new employee, and contact information, such as at least one of an email address, a telephone number, or the like.

In response, the payroll module 124 on the service computing device 104 may use the contact information (e.g., email address, phone number, etc.) to send an employee information request 132 to an employee computing device 110 associated with the new employee. For instance, suppose that the new employee request 130 included an email address of the new employee. The payroll module 124 may send an email communication to the provided email address. The employee 114 may access the email communication using the employee computing device 110.

As one example, the email communication may include a link for the employee to select to provide employee information 134 to the service computing device 104. For instance, selection of the link may cause the browser or other employee application 120 to navigate to a network location to present a user interface including blank boxes, or the like, to enable the employee to fill in the requested employee information. As another example, the employee application 120 may be configured to present the UI 122 in response to code in the communication 132. In some cases, the employee information may be sent to the service computing device 104 incrementally, e.g., as the employee fills in each blank. Alternatively, the employee information may be sent together as a batch, such as in response to the employee selecting a send button, or the like, upon completion of the form(s) or otherwise providing requested information to the UI 122.

Examples of employee information 134 that may be requested by the employee information request 132 may include the employee's first, middle, and last names 136; mailing address 138; city, state, and postal code 140; telephone number 142; email address 144; tax payer identifier (SSN, ITIN) 146; date of birth 148; federal withholding information (e.g., a filled-out IRS Form W-4) 150; state withholding information 152 (if the relevant state has an income tax); employment eligibility (USCIS Form I-9) 154; bank account information for receiving direct deposit of payroll payments 156, and so forth. In some examples, additional information (not shown) may be provided by the employee, such as marital status, sex, country of citizenship, passport number, and so forth. For instance, approximately thirty fields may be completed in some examples to provide the above information and/or other information to the service computing device 104.

When the employee information 134 is received from the employee computing device 110 by the service computing device 104, the payroll module 124 may apply the employee information to the payroll for the employer profile 126 corresponding to the particular employer who requested that the new employee be added to the payroll. For example, the payroll module 124 may schedule a next payroll payment to be made to the employee based, e.g., on a start date of the particular employee, wage information for the employee, and so forth. For example, the payroll module may receive payroll information 160 from the employer that indicates an amount to be paid to the employee, such as on an hourly basis, a salary basis, a commission basis, gratuities, and so forth. Further, the payroll information 160 may specify how frequently the employee is to be paid, and/or may include other information, as discussed herein.

In addition, in response to receiving the employee information 134 from the employee computing device 110, the service computing device 104 may send at least a portion 162 of the employee information to the employer computing device 108. For instance, the portion 162 of the employee information sent to the employer computing device 108 may include forms that are to be signed or otherwise completed by at least one of the employer or the employee. Examples of such forms include IRS Form W-4 and USCIS Form I-9, although other forms, such as for state withholding, etc., may also or alternatively be included.

As mentioned above, the employee may provide the employee information 134 to the service provider 102 only one time, and the employee 114 may subsequently use this employee information 134 when starting jobs with additional employers. For instance, if the employee quits the job with the current employer and goes to a new employer that uses the service provider 102 for payroll processing, then the new employer may merely provide one or more identifiers of the employee, such as name and email address, SSN, or the like, and the employee does not have to re-enter any of the employee information 134 unless there are changes that have not yet been updated.

Further, the employee 114 may update the employee information 134 in the employee's own respective employee profile 128, such as by accessing the employee profile 128 through a browser or other application 612, and the payroll module 124 may automatically apply the updates without any action on the part of the employer 112. As one example, suppose that the employee 114 wishes to change the number of withholding exemptions in the employee's W-4 form. The employee does not have to ask the employer for access to the employee's information, but rather may access the employee profile 128 and make the desired changes to the withholding exemptions. Changes to other types of information such as address, phone number, email address, etc., may be made in a similar manner. Further, even in the case that the employer does not use the payroll service provided by the service provider 102, the employee may still download prefilled forms, such as IRS form W-4 and USCIS form I-9.

In some examples, in addition to the employee information 134, the employee 114 may provide other types of information that may be stored in the employee profile 128. For example, the employee 114 may provide employee education information and/or employee employment history, which may be useful to employers or prospective employers. For example, the employee 114 may provide information that may be used to auto populate employment applications, such as education information including high school attended, whether the employee received a high school diploma, received a certificate of high school equivalency, etc., colleges or universities attended by the employee, degrees received, dates of attendance, and so forth.

Furthermore, the employee 114 may provide and/or the service provider 102 may generate employment history information for the employee 114. For instance, when the employee 114 first creates an employee profile 128, the employee 114 may provide past employment information to the service computing device 104. Subsequently, as the employee 114 uses the payroll service provided by the service provider 102, the service provider 102 may update and maintain the employment history for each additional job held by the employee 114. For example, when the employee 114 first uses the payroll service for a job with a first employer 112, the service provider 102 will know the start date of the first job, wage information, and the like, and this information may be added to the employee's employment history information, along with the name and contact information of the first employer 112. Thus, when the employee 114 applies for a new job with a prospective employer, the employee 114 may instruct the service provider 102 to send the employment history information to the prospective employer. The employee's employment history may include both employment history information provided by the employee and employment history information automatically determined and updated by the service provider 102.

Further, the employment history information may include employment reference information since the contact information of each employer may be included with the employment history of the employee. Accordingly, the service provider 102 may automatically provide employment history, including employment references for the employee 114, so that the employee 114 does not have to provide this information manually for each job for which the employee 114 applies. For example, if the contact information for a previous employer of the employee changes, the information is received in the employer profile 126 associated with the previous employer. In response, the service provider 102 may automatically update the contact information for the previous employer in the employee's employment history to enable a prospective employer of the employee to contact the previous employer so that the previous employer may continue to serve as an employment reference for the employee.

Additionally, during the course of the employee's employment at one or more jobs, the service provider 102 may further have received detailed job attendance information about the employee 114 that may be included in the employee's employment history in some cases. For example, as part of providing the payroll service, the service provider 102 may receive information regarding the days and hours worked by the employee 114 at each job. The service provider 102 may store in the employee profile 128 the hours worked by the employee 114, the days of the week worked by the employee 114, and so forth. Accordingly, the employment history may automatically include information related to the average hours worked per week by the employee 114, days of the week on which the work was typically performed, and so forth. Thus, in some examples, the employee 114 may elect to have this detailed attendance information shared with a prospective employer as well. Further, the employee may add to the employee profile 128 various other types of information that are typically requested in employment applications, so that, at the request of the employee 114, this information may be automatically provided to a prospective employer when the employee 114 is applying for a job.

In some examples, employee information 134 in the employee profile 128 may be protected from unauthorized access. For example, the service computing device 104 may require employee authorization information prior to allowing access to the employee information 134. For example, the employee authorization information may include a password, biometric information, such as a fingerprint, or other employee credential. The employee may provide this authorization information 158 to the service computing device 104 when initially providing the employee information. Subsequently, if an employer, such as a new employer wants to add the employee to the employer's payroll, in response to receiving the new employee request 130, the employee information request 132 may merely include a request for employee authorization for the employee's information to be added to the employer's payroll.

Additionally, as an alternative, rather than sending the employee information request 132 when the employee first starts working for the employer 112, the service computing device 104 may delay sending the employee information request 132 until it is time for the payroll module 124 to make a payroll payment to the employee 114. For instance, by delaying the request until a payroll payment is due, the employee is more likely to promptly and accurately complete the requested employee information 134.

As one example, each piece of the received employee information may be tagged, such as using XML (extensible markup language) tagging, to identify the semantic information for each piece of employee information. For instance, the employee first name may be tagged with a "first name" tag, the employee social security number may be tagged with an "SSN" tag, and so forth, to enable the information to be added at correct locations in the employer payroll information, the correct location in forms, such as a W-4 form, and the like. Additionally, or alternatively, each piece of employee information may be added to a corresponding field or column in a relational database. The employee information in the relational database may be associated with the employer payroll information by associating a record or row including the particular employee's information with the payroll information of the particular employer. Further, while several examples for storing and managing the employee information are discussed, numerous other variations will be apparent to those of skill in the art having the benefit of the disclosure herein.

In addition, as mentioned above, the service computing device 104 may maintain an employer profile 126 for each employer that utilizes the payroll service offered by the service provider 102. For instance, the employer profile may include the employer's employer identification number (EIN) obtained from the IRS, payroll information, such as wages to be paid each employee, dates on which payments should be made, and so forth. Further, the employer profile 126 may include employer bank account information to enable funds to be transferred from a bank account of the employer 112 to a bank account of the service provider 102. In some cases, the bank of the service provider 102 may receive one or more fund transfers from the employer's bank, and the service provider 102 may distribute a first portion of this money as payroll payments to the employees 114, and may use a second portion of this money to pay federal, state and/or local tax withholdings on behalf of the employees.

Funds may be transferred from the bank of the employer to the bank of the service provider, and from the bank of the service provider to the employees 114 using any suitable technique. As one example, money may be transferred between banks using conventional ACH (automated clearing house) payments. For example, ACH payments employ a convention adopted by the US banking industry that includes an electronic network for financial transactions in the United States. ACH processes large volumes of credit and debit transactions in batches. ACH credit transfers may include direct deposit payroll and vendor payments. ACH direct debit transfers may include consumer payments on insurance premiums, mortgage loans, and other kinds of bills. Both the US government and the commercial sectors use ACH payments. Rules and regulations that govern the ACH network are established by NACHA (National Automated Clearing House Association) and the Federal Reserve. Credit card payments are handled by separate networks overseen by the major card companies.

The service provider 102 may make payments to the employees 114 using any suitable payment techniques. As some examples, the payroll payments may be by check or by direct deposit to an account of a respective employee. For instance, the service provider 102 may mail checks to the residences of respective employees 114, or may mail the checks to the employer 112 for distribution to the employees 114 by the employer 112. As another example, the payroll payments may be made by direct deposit to bank accounts of the respective employees using ACH or any other suitable fund transfer techniques.

Figure 2:
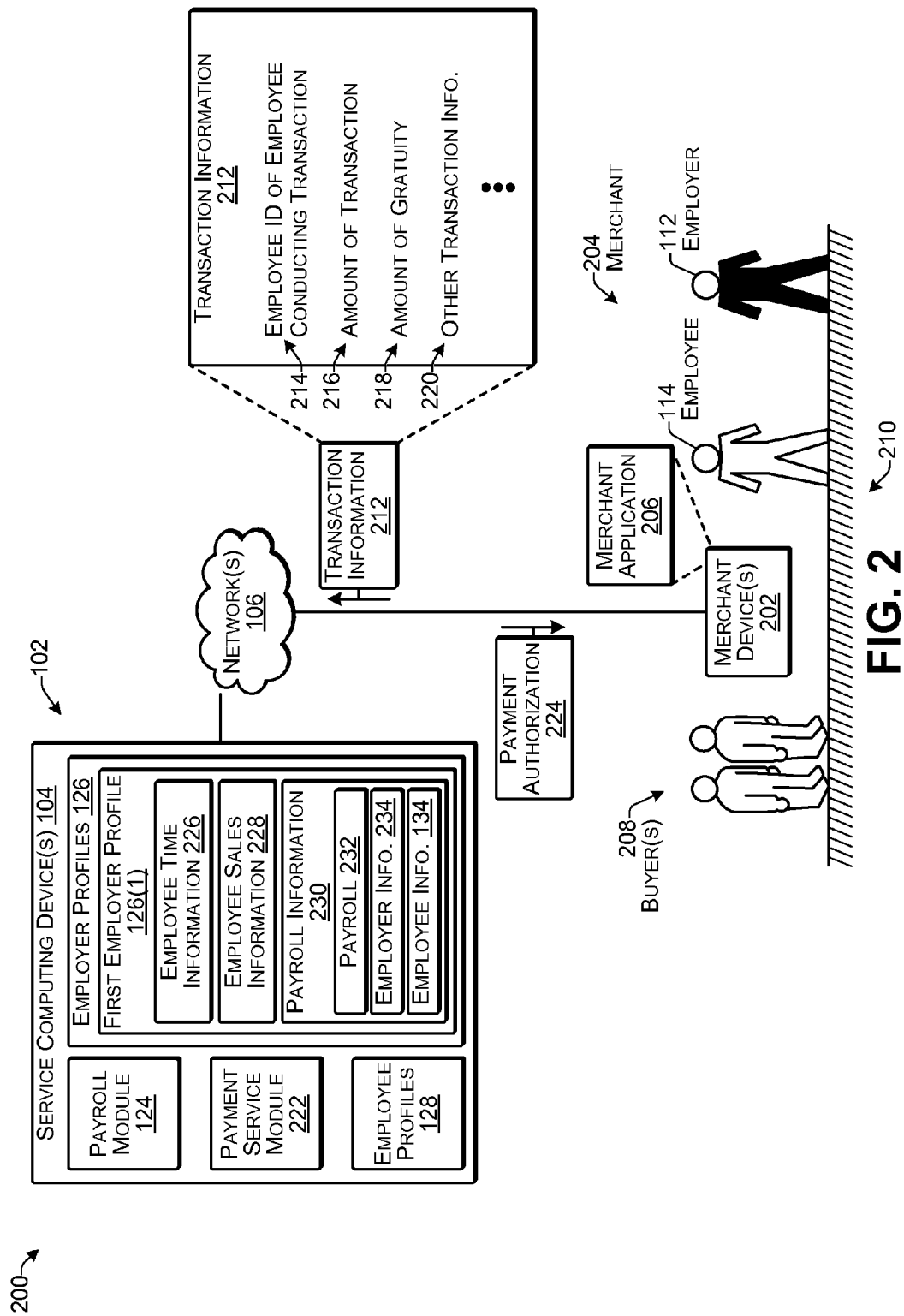
FIG. 2 illustrates an example environment for a payroll and payment service according to some implementations.

FIG. 2 illustrates an example environment 200 for a payroll and payment service according to some implementations. For example, the service provider 102 may provide the payroll service discussed above, and may also provide a payment service that enables merchants to conduct point of sale (POS) transactions with buyers who acquire goods and/or services from the merchants. In some cases, as discussed additionally below, the payment service and the payroll service may be able to share information, e.g., information from the payment service may be used to determine at least a portion of compensation due to one or more employees, such as for gratuities, commission, hourly wages, and the like.

In the illustrated example, at least one merchant device 202 is able to communicate over the one or more networks 106 with the one or more service computing devices 104 of the service provider 102. In some examples, the merchant device 202 may be the same computing device as the employer computing device 108 discussed above. In other examples, the merchant device 202 may be a different computing device. The merchant device 202 may be associated with a merchant 204, which may include the employer 112 and/or one or more employees 114 or other agents of the employer 112.

Additionally, in some examples, a plurality of other merchant devices (not shown in FIG. 2) may be associated with a plurality of other merchants who may also participate in the payment service provided by the service provider 102. Each merchant device 202 may include an instance of a merchant application 206 that executes on the merchant device 202. The merchant application 206 may provide POS functionality to the merchant device 202 to enable the merchant 204 to accept payments from one or more buyers 208 at a POS location 210. For example, the merchant 204 may use the merchant device 202 to accept payments through various different types of payment instruments, e.g., payment cards, electronic payment, cash or check, at the POS location 210 from the one or more buyers 208.

Regardless of the type of payment instrument used, the merchant 204 and the buyer 208 may conduct a transaction by which the buyer 208 acquires an item (e.g., a good or service) from the merchant 204 at the POS location 210. The merchant application 206 on the merchant device 202 may send transaction information 212 to the service computing device 104, e.g., while the transaction is being conducted at the POS location 210. In other examples, such as if the merchant device 202 is processing transactions offline, the transaction information 212 may be sent in a batch at a subsequent point in time or using other suitable techniques.

The transaction information 212 may include an employee identifier 214 associated with the particular employee 114 that is conducting the transaction. For example, the employee 114 may login to the merchant device 202 using a pin, a login ID, biometric information, or the like, to provide an indication that the particular transaction is being conducted by the particular employee. In some examples, multiple employees 114 may share a merchant device 202 and may enter a pin, biometric information, or other identifier 214 before each transaction to indicate which employee should receive credit for conducting the particular transaction. The transaction information 212 may further include an amount 216 of the transaction, such as a total amount, amount per item, etc., and may further include an amount of gratuity 218 associated with the transaction if any.

The transaction information 212 may include other transaction information 220 such as regarding the time and place of the transaction, information related to the item(s) acquired, a type of payment being used (e.g., cash, check, payment card, electronic payment), as well as additional information, such as buyer identifying information. For instance if a payment card, such as a credit card, debit card, charge card, prepaid card, or the like, is used as a payment instrument, the transaction information 212 can include data stored in the payment card, e.g., Track 1 data (cardholder name, card number and other card information). In addition, when completing the transaction, a buyer 208 may sometimes provide an email address for receiving a receipt through email, a phone number for receiving a receipt via text message, or the like. Additional examples of other transaction information 220 that can be captured include detailed item information, e.g., descriptors of the items (size, flavor, color, model, etc.), geolocation data indicating a geographic POS location of a particular transaction, online/offline card data, data describing the merchant 204 and/or the merchant device 202, e.g., a merchant identifier, a merchant category code (MCC), or the like.

A payment service module 222 on the service computing device 104 may receive the transaction information 212 and may associate the transaction information 212 with a particular employer profile 126(1) maintained by the service computing device 104 for the particular employer 112. In addition, if the buyer 208 is using a payment instrument, such as a payment card or an electronic payment account, that requires authorization, the payment service module 222 may determine whether the payment instrument is authorized to be used to pay for the transaction. If the payment instrument is authorized, the payment service module 214 may send a payment authorization 224 to the merchant device 202 to indicate to the merchant 204 that the payment card has been approved, use of the electronic payment account is approved, or the like.

In addition, at least a portion of the transaction information 212 may be associated with the first employer profile 126(1) corresponding to the particular merchant 204 and employer 112. For example, the transaction information 212 and other information received from the merchant device 202 may be used to track employee hours, employee sales, and/or employee gratuities. Thus, when an employee arrives at work, the employee may login to the merchant device 202, which may serve the same purpose as punching a time clock, and this login information may be sent to the service computing device 104. Similarly, when the employee leaves for the day, the employee may logout of the merchant device 202, and this logout information may also be sent to the service computing device 104. Accordingly, the service computing device 104 may store employee time information 226 in the first employer profile 126(1) corresponding to the particular merchant 204 and the employer 112. The payroll module 124 may use the employee time information to determine payroll payments for individual employees of the employer 112, such as based on an amount of time worked by each employee 114.

Additionally, the service computing device 104 may extract employee sales information 228 from the transaction information 212. For example, if an employee works for a commission, such as a percentage of gross sales, the employee sales information 228 may include the aggregated sales (e.g., amounts 216 of transactions) associated with each employee ID 214 per period of time, such as over the past day, past week, past month, past year, etc. The payroll module 124 may determine payroll payments to be made to the employee based on one or more payroll rules established by the employer 112, such as the employee gets paid 10% of gross sales per week, on a weekly basis, or other suitable payroll rule.

Further, if the employee works in an industry in which tipping is customary, then the employee sales information 228 may include gratuity-amount information as well. For example, if an employee works for gratuities as a part of the employee's compensation, the payroll module 124 may determine the gratuities 218 received in association with each employee ID 214 per period of time, such as over the past day, past week, past month, etc., and the payroll module 124 may determine payroll payments to be made to the employee based on one or more payroll rules established by the merchant, such as the employee gets paid 80% of gross gratuities per week, with the other 20% going to other employees, or other suitable payroll rule.

In addition, the first employer profile 126(1) may include payroll information 230. For example, the payroll information 230 may be provided to the service computing device 104 by the employer 112 and/or by the employees 114. For example, the employer 112 may provide a payroll 232 that lists one or more employees and that provides wage information for each employee. The wage information may include whether the particular employee is paid by the hour or by a salary, how much the employee is to be paid, whether the employee is eligible for overtime, whether the employee is eligible for a commission or bonus, whether the employee receives tip income, and so forth. Furthermore, the payroll 232 may include one or more employer establish rules for making payments to the employees such as the frequency of payroll payments, conditions under which commissions or bonuses may be paid, rules for distributing tip income, and so forth.

In addition, the payroll information 230 may include employer information 234, which includes payroll-related information about the employer 112, such as the employer's tax identification number, the employer's bank account information, and so forth. Furthermore, the payroll information 230 may include the employee information 134 discussed above, which may be obtained for each employee 114, and which may be added to the payroll information 230 for the particular employer, e.g., with authorization from the employee. As discussed above, examples of the employee information 134 may include the employee's full name, mailing address, telephone number, email address, taxpayer identifier, date of birth, federal withholding information, state withholding information, employment eligibility information, bank account information for receiving direct deposits, and so forth.

Figure 3:
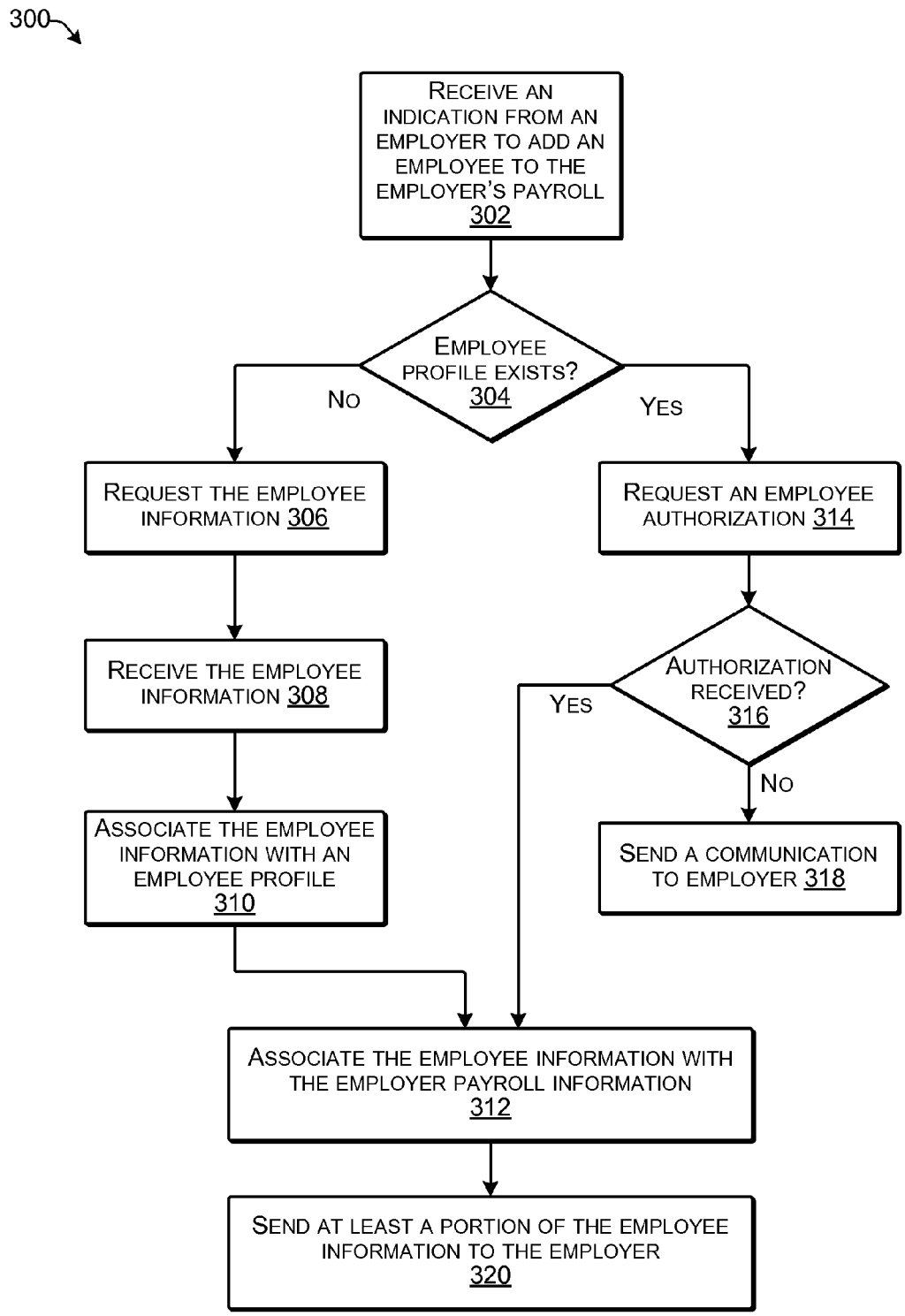
FIG. 3 is a flow diagram illustrating an example process for a payroll service according to some implementations.
Figure 4:
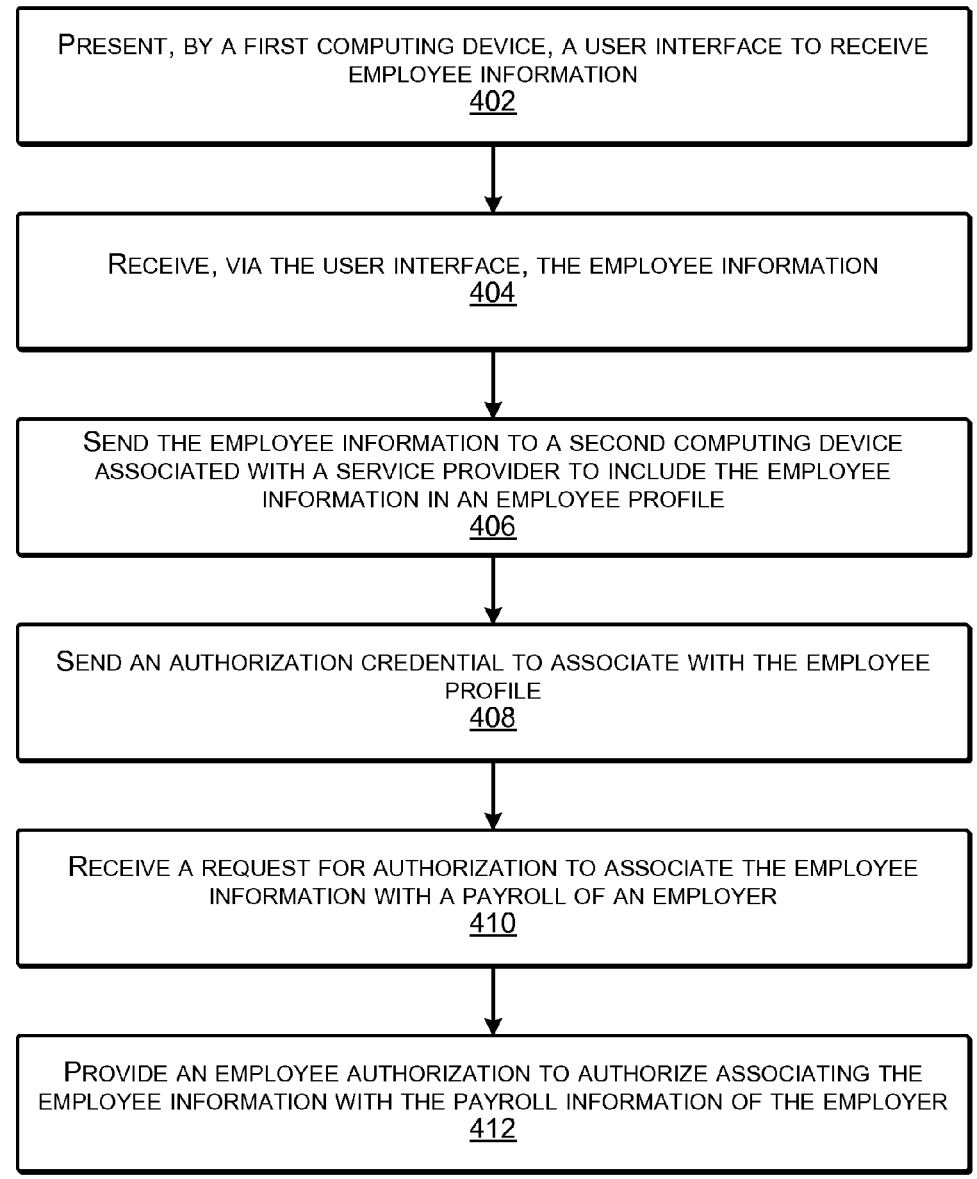
FIG. 4 is a flow diagram illustrating an example process for a payroll service according to some implementations.
Figure 5:
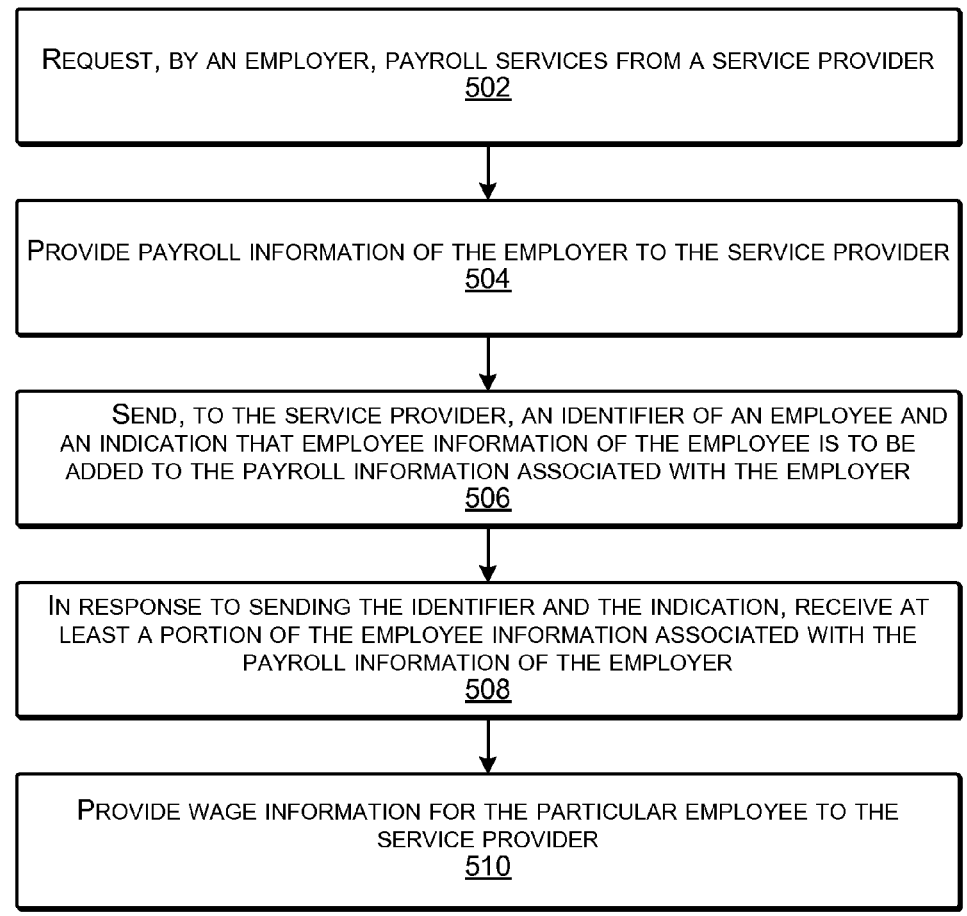
FIG. 5 is a flow diagram illustrating an example process for a payroll service according to some implementations.

FIGS. 3-5 are flow diagrams illustrating example processes according to some implementations. The processes of FIGS. 3-5 below are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and devices described in the examples herein, although the processes may be implemented in a wide variety of other environments, architectures and devices.

FIG. 3 is a flow diagram of an example process 300 according to some implementations. In some examples, the example process 300 of FIG. 3 may be executed by the service computing device 104, or by another suitable computing device.

At 302, the computing device may receive an indication from an employer to add an employee to the employer's payroll. For example, the employer may send a communication to the service computing device requesting that the service provider add an employee to a payroll of the employer. Furthermore, the employer may include with the communication an identifier of the employee, which may enable the service provider to identify an employee profile of the employee and/or which may enable the service provider to contact the employee. As one example, the employer may provide an email address of the employee, a telephone number of the employee, or the like, to the service provider. As another example, the employer may provide a social security number, name, or other identifier, which the service provider may cross-reference with existing employee profiles to attempt to locate a matching employee profile for the particular employee.

At 304, the computing device may determine whether there is an existing employee profile for the employee. For instance, as mentioned above, the service provider may attempt to match the received employee identification information with information in the existing employee profiles maintained by the service provider.

At 306, if the computing device is unable to locate a matching employee profile, the computing device may send a request for employee information to the employee. For example, the computing device may send an email, text message, or other electronic communication to the employee requesting that the employee provide the requested employee information. For instance, the computing device may send an email that includes a link to connect the computing device of the employee to the computing device of the service provider to enable the employee to provide the requested employee information. As one example, the communication may include a link or other network reference that connects a web browser or other application of the employee to a service provider website that enables the employee to enter requested information into an HTML form, a webpage, or the like.

At 308, the computing device may receive the employee information. As one example, the employee may fill in text boxes, or the like, that request specific information. The employee information provided by the employee may be sent from the employee computing device to the service computing device of the service provider. In some examples, the employee information may include a full name of the employee, a mailing address of the employee, a telephone number of the employee, an email address of the employee, a taxpayer identifier of the employee, a date of birth of the employee, federal withholding information of the employee, state withholding information of the employee, employment eligibility information for the employee, bank account information of the employee, such as for receiving a direct payroll deposit, and so forth.

At 310, the service provider may associate the employee information with an employee profile. For example, in the case that the service provider uses a relational database, the information provided by the employee may be related to the employee profile in the relational database. Further, numerous other techniques may be used for storing the employee information, and for relating the employee information to the employee profile and/or to the employer payroll information.

At 312, the computing device may associate the employee information with the employer payroll information of the employer that requested the employee be added to the employer's payroll. The employee information may be associated with the employer's payroll, and may be used when determining a payroll payment to be made to the particular employee, such as for determining the amount of taxes to be withheld from the payroll payment, the SSN with which the tax withholdings should be associated, a bank account to which the payroll payment should be deposited, and so forth.

At 314, on the other hand, if an employee profile already exists for the identified employee, the computing device may request an employee authorization to associate the employee information with the employer payroll information. As one example, the service provider may receive implicit authorization for associating the employee information with the employer's payroll, such as by the employee submitting requested employee information to the service provider, either through the employee's own computing device, or through a computing device of the employer. As another example, the service provider may receive explicit authorization, such as by receiving a password, shared secret, and/or biometric information of the employee as an indication of the authorization from the employee to associate the employee information with the payroll information of the employer.

At 316, the computing device may determine whether an authorization of the employee has been received. As mentioned above, in some examples the authorization may be explicit, while in other examples, the authorization may be implicit.

At 318, if an authorization is not received from the employee, the computing device may send a communication to the employer to inform the employer that the employee has not provided authorization to associate the employee's information with the employer's payroll information. On the other hand, if authorization is received from the employee, the employee information is associated with the employer payroll information as discussed above with respect to 312.

At 320, if the employee information has been or will be associated with the employer payroll information, the computing device may send at least a portion of the employee information to the employer, such as to the computing device of the employer. As one example, the portion of employee information sent to the employer may include at least information that requires signature and/or verification from either the employee or the employer. For instance, the employer and or the employee may be required to sign a federal employment eligibility form, which may be sent to the employer to be printed out prefilled with the employee's information. As another example, the employee may be required to sign a tax withholding exemption form, which may be sent to the employer or the employee in a prefilled condition able to be printed for the required signature. Additionally, in some examples, all the employee information added to the employer payroll information may be sent to the employer and/or the employee for verification that the information added to the employer payroll information is accurate.

FIG. 4 is a flow diagram illustrating an example process 400 according to some implementations. In some examples, the process 400 may be executed by the employee device 110, or by another suitable computing device.

At 402, the computing device may present a user interface to receive employee information. As one example, the service provider may send a communication to the employee such as an email, text message or the like, which may include a uniform resource locator (URL) or other link or reference to a network location for the employee to access in order to provide the requested employee information. Accordingly, the employee may select the link, which may cause an application on the employee computing device to present a user interface able to receive entry of the employee information by the employee.

At 404, the computing device may receive, via the user interface, the employee information. For example, the employee may enter the information into text entry areas in the user interface or may provide the employee information using any other suitable techniques.

At 406, the computing device may send the employee information to a second computing device associated with a service provider to include the employee information in an employee profile maintained by the service provider. For example, when the employee has finished entering the employee information into the user interface, or as the employee is entering information into the user interface, the information may be transmitted to the computing device of the service provider.

At 408, the computing device may send an authorization credential to be associated with the employee profile. For example, the employee may provide a password, shared secret, and/or biometric information to the service provider that can be used to control access to the employee information included in the employee profile maintained by the service provider.

At 410, the computing device may receive a request from the service provider for authorization to associate the employee information with a payroll of an employer. For example, the employee may have agreed to be hired by the employer and the employer may request that the service provider provide the employee information for addition to the payroll of the employer. Prior to adding the employee's information to the payroll of the employer, the service provider may request authorization from the employee to add the employee's information to the payroll of the employer.

At 412, the computing device may send an employee authorization to authorize associating the employee information with the payroll information of the employer. As one example, the employee may provide a password or other employee authorization credential as mentioned above to authorize the addition of the employee information to the payroll of the employer. As another example, the employee may provide implicit authorization to the service provider such as through one or more actions of the employee, e.g., providing the employee information in response to a court request of the service provider, or the like.

FIG. 5 is a flow diagram illustrating an example process 500 according to some implementations. In some examples, the process may be executed by the employer computing device 108, or by another suitable computing device.

At 502, the computing device may send a request from an employer to a service provider to request payroll services be provided to the employer. For example, the employer may request that the service provider provide payroll services to the employer such as by making payroll payments in a manner specified by the employer to one or more employees on the employer's payroll.

At 504, the computing device may provide payroll information to the service provider. For example, the computing device may send payroll information to the service provider such as the employer's payroll information, information identifying one or more employees on the payroll, and wage information indicating how much each employee is to be paid, types of payment, the frequency of payment and so forth.

At 506, the computing device may send, to the service provider, an identifier of an employee an indication that employee information of the employee is to be added to the payroll information associated with the employer. For example, the employer may identify the employee such as by name, email address, telephone number, Social Security number or the like. The service provider may attempt to determine whether there is already an existing employee profile for the employee. If not, the service provider may send a communication to the employee to request the employee information.

At 508, in response to sending the identifier and the indication to the service provider, the computing device may receive at least a portion of the employee information associated with the payroll information of the employer. For example, before, during or after the service provider has associated the employee information with the payroll information of the employer, the service provider may send at least a portion of the employee information to the employer as discussed above.

At 510, the employer may provide wage information for the particular employee to the service provider. For instance, the wage information for the particular employee may be provided to the service provider anytime before or after the employer provides the identifier of the employee to the service provider, as discussed above with respect to 506.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 6:
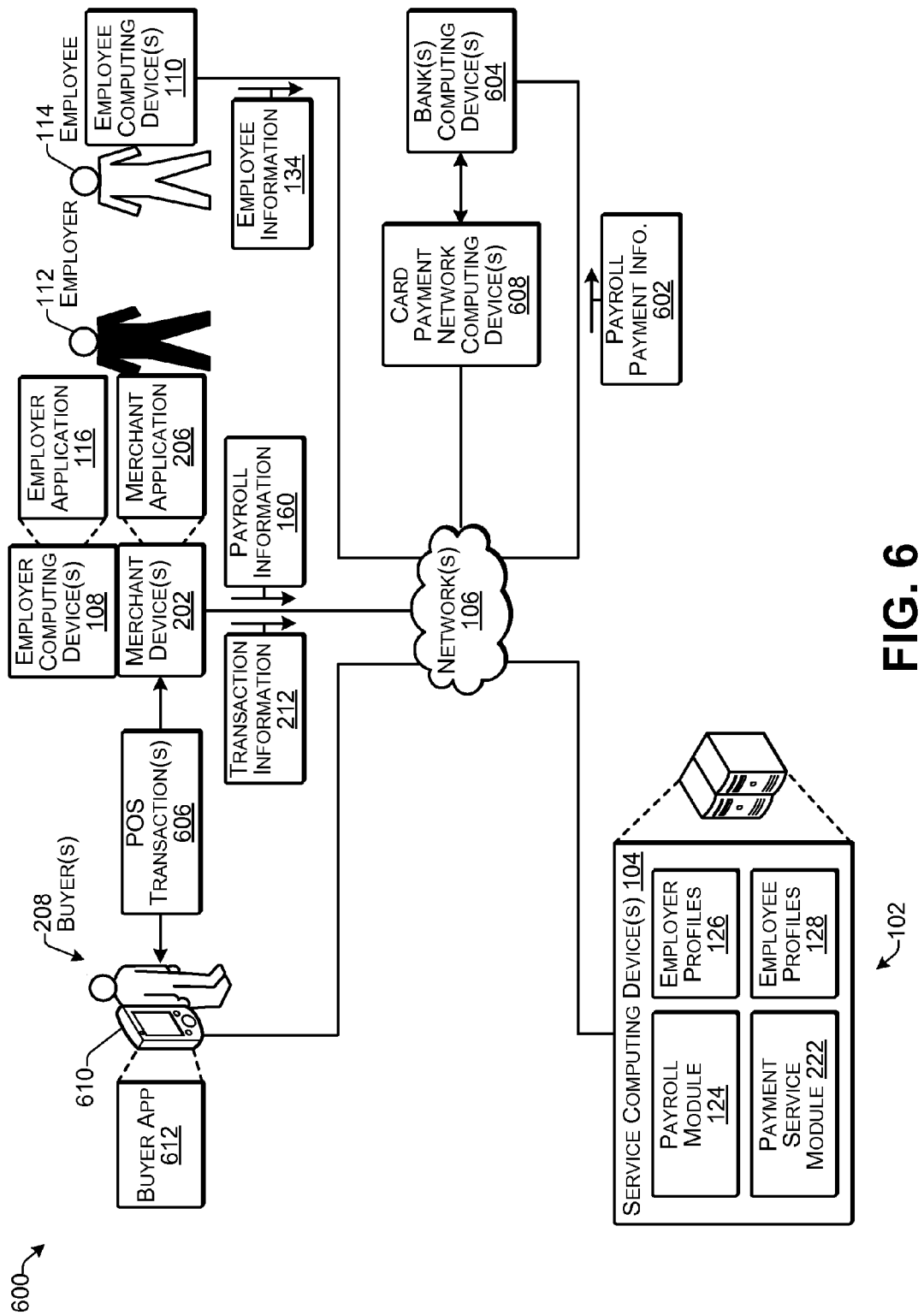
FIG. 6 illustrates an example architecture of a system for providing a payroll service and payment service according to some implementations.

FIG. 6 illustrates an example architecture of a payroll and payment system 600 able to provide a payroll service and/or a payment service according to some implementations. In the example of FIG. 6, the service computing device 104 of the service provider 102 includes the payroll module 124, which may be executed to provide the payroll payment service described herein. In addition, the service computing device 104 includes the payment service module 222, which may be executed to provide the financial payment and POS transaction service. In some examples, the employer computing device 108 and the merchant computing device 202 may be the same computing device, while in other examples, they may be separate computing devices. Further, in some examples, the employer application 116 and the merchant application 206 may be part of the same application, while in other examples, they may be separate applications.

As discussed above, the payroll module 124 may receive employee information 134 from the employee 114, and may associate the employee information 134 with a respective employee profile 128. Further, with authorization from the employee 114, the service provider 102 may associate the employee information 134 with payroll information of the employer, such as in a respective employer profile 126 associated with the employer 112. Subsequently, the payroll module 124 may determine a payroll payment amount to be paid to individual employees on the payroll of the employer.

The payroll module 124 may send payroll payment information 602 to one or more bank computing devices 604 associated with one or more banks. For example, the payroll module 124 may request payment from a bank account of the employer 112 to a bank account of the service provider 102 in the amount calculated to be the total payout of the payroll for the current pay period. For instance, the payment from the account of the employer to the account of the service provider may be made using ACH payment techniques, as discussed above. In some examples, the service provider may provide the payroll payment information 602 to the employer for approval prior to sending the payroll payment information 602 to the one or more bank computing devices 604. When the funds have been transferred from the employer's account to the account of the service provider, the service provider may receive a notification from the bank. In response, the service provider can distribute the payroll payments to the employees of the employer according to the calculated payroll payments for each employee. As some examples, the payroll payment may be by direct deposit, check, or cash.

In addition, when providing the payment service, the payment service module 222 may receive at least transaction information 212 for processing payments made by buyers. For example, the payment service module 222 may receive transaction information 212, such as an amount of a POS transaction 606 and payment instrument information. For instance, if the buyer 208 is using a payment card, the payment service module 222 may verify that the payment card is able to be used to pay for the transaction, such as by contacting a card payment network clearinghouse computing device 608 or other bank computing device 604. The payment service module 222 and corresponding payment functionality may be implemented as one or more computer programs, or other executable instructions, on the service computing device 104 in one or more locations, such as for providing the payment systems, components, and techniques described herein.

In some examples, one or more of the buyers 208 may have a buyer device 610 that can execute a buyer application 612. For instance, some buyers 208 may carry buyer devices 610, such as smart phones, tablet computers, wearable computing devices, or the like, as further enumerated elsewhere herein, and some of these buyer devices 610 may have installed thereon the buyer application 612. The buyer application 612 may include electronic payment capability, which enables the buyer 208 to make a payment to the merchant 204 using an account associated with the buyer application 612, rather than paying with a physical payment card, cash, check, etc. Additionally, while only a single buyer device 610 and a single merchant device 202 are illustrated in the example of FIG. 6, in some implementations, there may be thousands, hundreds of thousands, or more, of the buyer devices 610 and the merchant devices 202.

The one or more networks 106 can include any appropriate network, including a wide area network, such as the Internet; a local area network, such an intranet; a wireless network, such as a cellular network, a local wireless network, such as Wi-Fi and/or close-range wireless communications, such as Bluetooth® and Bluetooth® low energy; a wired network; or any other such network, or any combination thereof. Accordingly, the one or more networks 106 may include both wired and/or wireless communication technologies, including Bluetooth®, Bluetooth® low energy, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The employer profiles 126 and/or the employee profiles 128 described herein may be created and maintained using any suitable types of data structures, and using any suitable data storage or database techniques. In some examples, the employee information and other payroll information may be maintained in a relational database in which pieces of information for individual profiles may be stored distinctly from one another, but are related to or otherwise associated with each other in the relational database. For instance, a particular employee profile 128 may be obtained by generating a view of a portion the data related in the database to the particular employee profile 128, or by otherwise extracting the data from the database. Alternatively, of course, other types of storage techniques may be used for generating and maintaining the employee profiles 128 and/or the employer profiles 126.

The payment service can include one or more servers that are configured to perform securely electronic financial transactions, e.g., electronic payments for transactions between a buyer and a merchant, for example, through data communicated between the buyer device 610 and the merchant device 202. Generally, when a buyer and a merchant enter into an electronic payment transaction, the transaction is processed by electronically transferring funds from a financial account associated with the buyer account to a financial account associated with the merchant account.

The payment service module 222 can also be configured to communicate with the one or more computing devices 608 of a card payment network (e.g., MasterCard®, VISA®) over the one or more networks 106 to conduct financial transactions electronically. The payment service can also communicate with one or more bank computing devices 604 of one or more banks over the one or more networks 106. For example, the payment service module 222 may communicate with an acquiring bank, and/or an issuing bank, and/or a bank maintaining buyer accounts for electronic payments.

Figure 7:
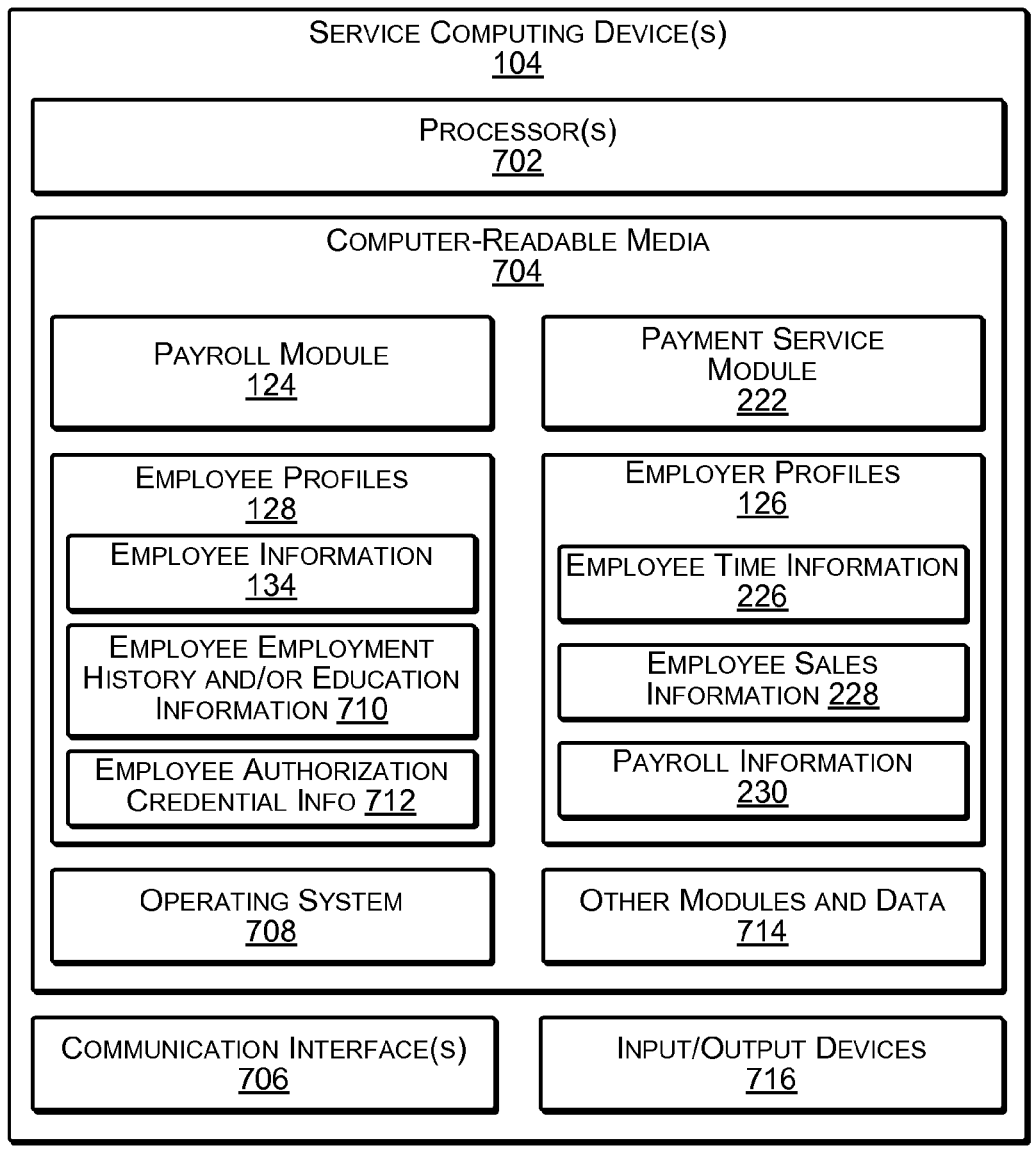
FIG. 7 illustrates select components of one or more example service computing devices according to some implementations.

FIG. 7 illustrates select components of the service computing device 104 that may be used to implement some functionality of the payroll service described herein. The service computing device 104 may be operated by a service provider that provides the payroll service, and may include one or more servers or other types of computing devices that may be embodied in any number of ways. For instance, in the case of a server, the modules, other functional components, and data may be implemented on a single server, a cluster of servers, a server farm or data center, a cloud-hosted computing service, a cloud-hosted storage service, and so forth, although other computer architectures may additionally or alternatively be used.

Further, while the figures illustrate the components and data of the service computing device 104 as being present in a single location, these components and data may alternatively be distributed across different computing devices and different locations in any manner. Consequently, the functions may be implemented by one or more service computing devices, with the various functionality described above distributed in various ways across the different computing devices. Multiple service computing devices 104 may be located together or separately, and organized, for example, as virtual servers, server banks and/or server farms. The described functionality may be provided by the servers of a single entity or enterprise, or may be provided by the servers and/or services of multiple different buyers or enterprises.

In the illustrated example, each service computing device 104 may include one or more processors 702, one or more computer-readable media 704, and one or more communication interfaces 706. Each processor 702 may be a single processing unit or a number of processing units, and may include single or multiple computing units or multiple processing cores. The processor(s) 702 can be implemented as one or more microprocessors, microcomputers, microcontrollers, digital signal processors, central processing units, state machines, logic circuitries, and/or any devices that manipulate signals based on operational instructions. For instance, the processor(s) 702 may be one or more hardware processors and/or logic circuits of any suitable type specifically programmed or configured to execute the algorithms and processes described herein. The processor(s) 702 can be configured to fetch and execute computer-readable instructions stored in the computer-readable media 704, which can program the processor(s) 702 to perform the functions described herein.

The computer-readable media 704 may include volatile and nonvolatile memory and/or removable and non-removable media implemented in any type of technology for storage of information, such as computer-readable instructions, data structures, program modules, or other data. Such computer-readable media 704 may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device 104, the computer-readable media 704 may be a type of computer-readable storage media and/or may be a tangible non-transitory media to the extent that when mentioned, non-transitory computer-readable media exclude media such as energy, carrier signals, electromagnetic waves, and signals per se.

The computer-readable media 704 may be used to store any number of functional components that are executable by the processors 702. In many implementations, these functional components comprise instructions or programs that are executable by the processors 702 and that, when executed, specifically configure the one or more processors 702 to perform the actions attributed above to the service computing device 104. Functional components stored in the computer-readable media 704 may include the payroll module 124 and the payment service module 222. Additional functional components stored in the computer-readable media 704 may include an operating system 708 for controlling and managing various functions of the service computing device 104.

In addition, the computer-readable media 704 may store data used for performing the operations described herein. Thus, the computer-readable media may store the employer profiles 126, including the employee time information 226, employee sales information 228 and payroll information 230. In addition, the employee profiles 128 may include employee information 134, employee employment history and/or education information 710, and employee authorization credential information 712, which may be used by the employee to authorize use of the employee information. The service computing device 104 may also include or maintain other functional components and data, such as other modules and data 714, which may include programs, drivers, etc., and the data used or generated by the functional components. Further, the service computing device 104 may include many other logical, programmatic and physical components, of which those described above are merely examples that are related to the discussion herein.

The communication interface(s) 706 may include one or more interfaces and hardware components for enabling communication with various other devices, such as over the network(s) 106. For example, communication interface(s) 706 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The service computing device 104 may further be equipped with various input/output (I/O) devices 716. Such I/O devices 716 may include a display, various user interface controls (e.g., buttons, joystick, keyboard, mouse, touch screen, etc.), audio speakers, connection ports and so forth.

Figure 8:
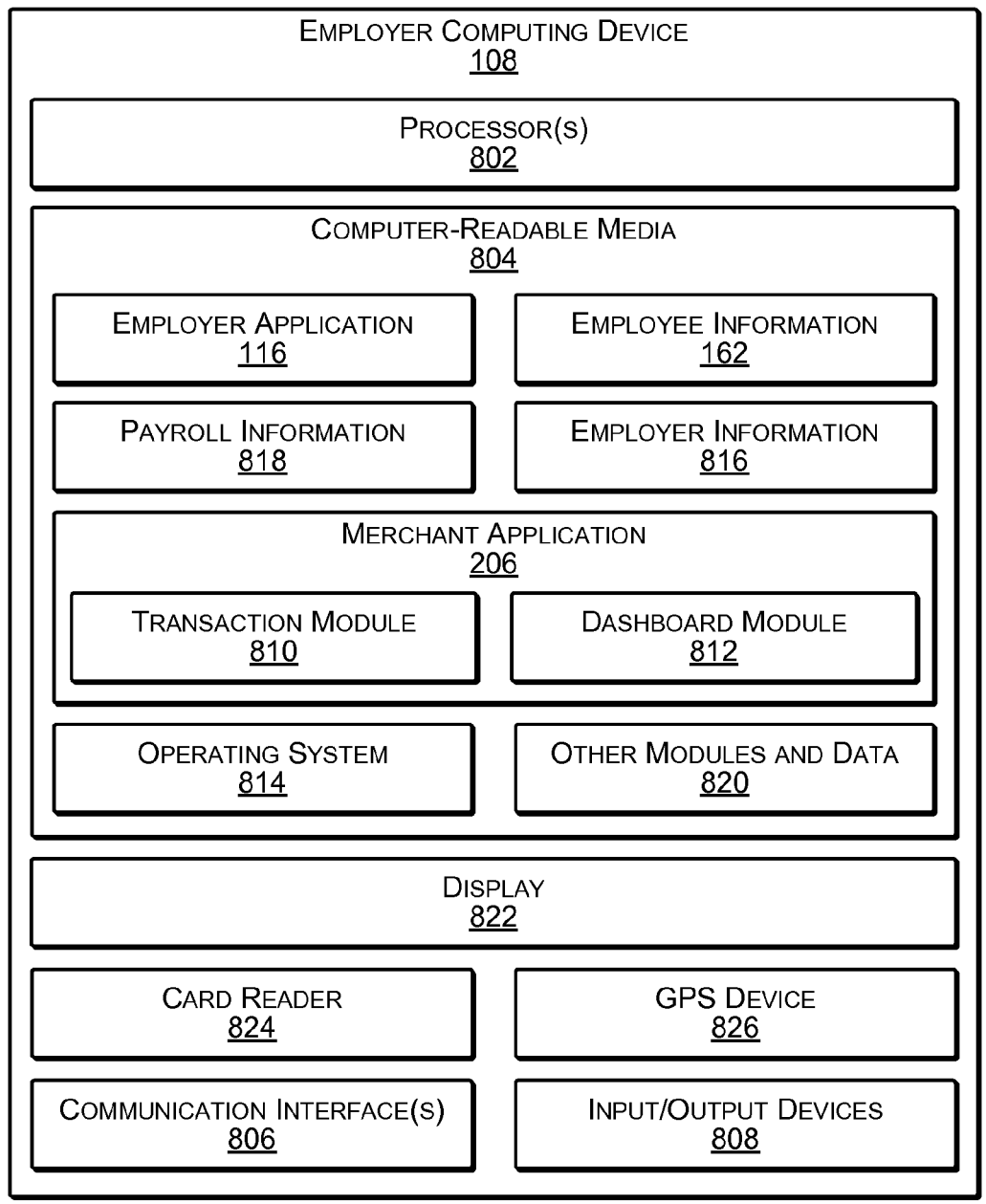
FIG. 8 illustrates select components of an example employer computing device according to some implementations.

FIG. 8 illustrates select example components of an example employer computing device 108, which in some examples may encompass the merchant device 202. The employer computing device 108 may be any suitable type of computing device, e.g., portable, semi-portable, semi-stationary, or stationary. Some examples of the employer computing device 108 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

In the illustrated example, the employer computing device 108 includes at least one processor 802, one or more computer-readable media 804, one or more communication interfaces 806, and one or more input/output (I/O) devices 808. Each processor 802 may itself comprise one or more processors or processing cores. For example, the processor 802 can be implemented as one or more microprocessors, microcomputers, microcontrollers, digital signal processors, central processing units, state machines, logic circuitries, and/or any devices that manipulate signals based on operational instructions. In some cases, the processor 802 may be one or more hardware processors and/or logic circuits of any suitable type specifically programmed or configured to execute the algorithms and processes described herein. The processor 802 can be configured to fetch and execute computer-readable processor-executable instructions stored in the computer-readable media 804.

Depending on the configuration of the employer computing device 108, the computer-readable media 804 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 804 may include, but is not limited to, RAM, ROM, EEPROM, flash memory, solid-state storage, magnetic disk storage, optical storage, and/or other computer-readable media technology. Further, in some cases, the employer computing device 108 may access external storage, such as RAID storage systems, storage arrays, network attached storage, storage area networks, cloud storage, or any other medium that can be used to store information and that can be accessed by the processor 802 directly or through another computing device or network. Accordingly, the computer-readable media 804 may be computer storage media able to store instructions, modules or components that may be executed by the processor 802. Further, when mentioned, non-transitory computer-readable media exclude media such as energy, carrier signals, electromagnetic waves, and signals per se.

The computer-readable media 804 may be used to store and maintain any number of functional components that are executable by the processor 802. In some implementations, these functional components comprise instructions or programs that are executable by the processor 802 and that, when executed, implement operational logic for performing the actions and services attributed above to the employer computing device 108. Functional components stored in the computer-readable media 804 may include the employer application 116. In addition, in some examples, the employer computing device 108 may include the merchant application 206, which includes a transaction module 810 and a dashboard module 812. For example, the transaction module 810 may present various user interfaces to enable the merchant to conduct transactions, receive payments, and so forth. Further, the dashboard module 812 may enable the merchant/employer to manage the merchant/employer account and the like. Additional functional components may include an operating system 814 for controlling and managing various functions of the employer computing device 108 and for enabling basic user interactions.

In addition, the computer-readable media 804 may also store data, data structures and the like, that are used by the functional components. For example, data stored by the computer-readable media 804 may include at least the portion 162 of the employee information, employer information 816, such as the employer's tax ID, and payroll information 818, such as a list of employees on the payroll of the employer.

Depending on the type of the employer computing device 108, the computer-readable media 804 may also optionally include other functional components and data, such as other modules and data 820, which may include programs, drivers, etc., and the data used or generated by the functional components. Further, the employer computing device 108 may include many other logical, programmatic and physical components, of which those described are merely examples that are related to the discussion herein.

The communication interface(s) 806 may include one or more interfaces and hardware components for enabling communication with various other devices, such as over the network(s) 106 or directly. For example, communication interface(s) 806 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 8 further illustrates that the employer computing device 108 may include a display 822. Depending on the type of computing device used as the employer computing device 108, the display 822 may employ any suitable display technology. For example, the display 822 may be a liquid crystal display, a plasma display, a light emitting diode display, an OLED (organic light-emitting diode) display, an electronic paper display, or any other suitable type of display able to present digital content thereon. In some examples, the display 822 may have a touch sensor associated with the display 822 to provide a touchscreen display configured to receive touch inputs for enabling interaction with a graphic interface presented on the display 822. Accordingly, implementations herein are not limited to any particular display technology. Alternatively, in some examples, the employer computing device 108 may not include the display 822, and information may be presented by other means, such as aurally.

The employer computing device 108 may further include the one or more I/O devices 808. The I/O devices 808 may include speakers, a microphone, a camera, and various user controls (e.g., buttons, a joystick, a keyboard, a keypad, etc.), a haptic output device, and so forth.

In addition, the employer computing device 108 may include or may be connectable to a payment card reader 824. In some examples, the card reader 824 may plug in to a port in the employer computing device 108, such as a microphone/headphone port, a data port, or other suitable port. The card reader 824 may include a read head for reading a magnetic strip of a payment card, and further may include encryption technology for encrypting the information read from the magnetic strip. Alternatively, numerous other types of card readers may be employed with the employer computing device 108 herein, depending on the type and configuration of the employer computing device 108.

Other components included in the employer computing device 108 may include various types of sensors, which may include a GPS device 826 able to indicate location information. Further, the merchant device may include one or more sensors 824, such as an accelerometer, gyroscope, compass, proximity sensor, camera, microphone, and/or a switch, as discussed above. Additionally, the employer computing device 108 may include various other components that are not shown, examples of which include removable storage, a power source, such as a battery and power control unit, a barcode scanner, a printer, a cash drawer, and so forth.

Figure 9:
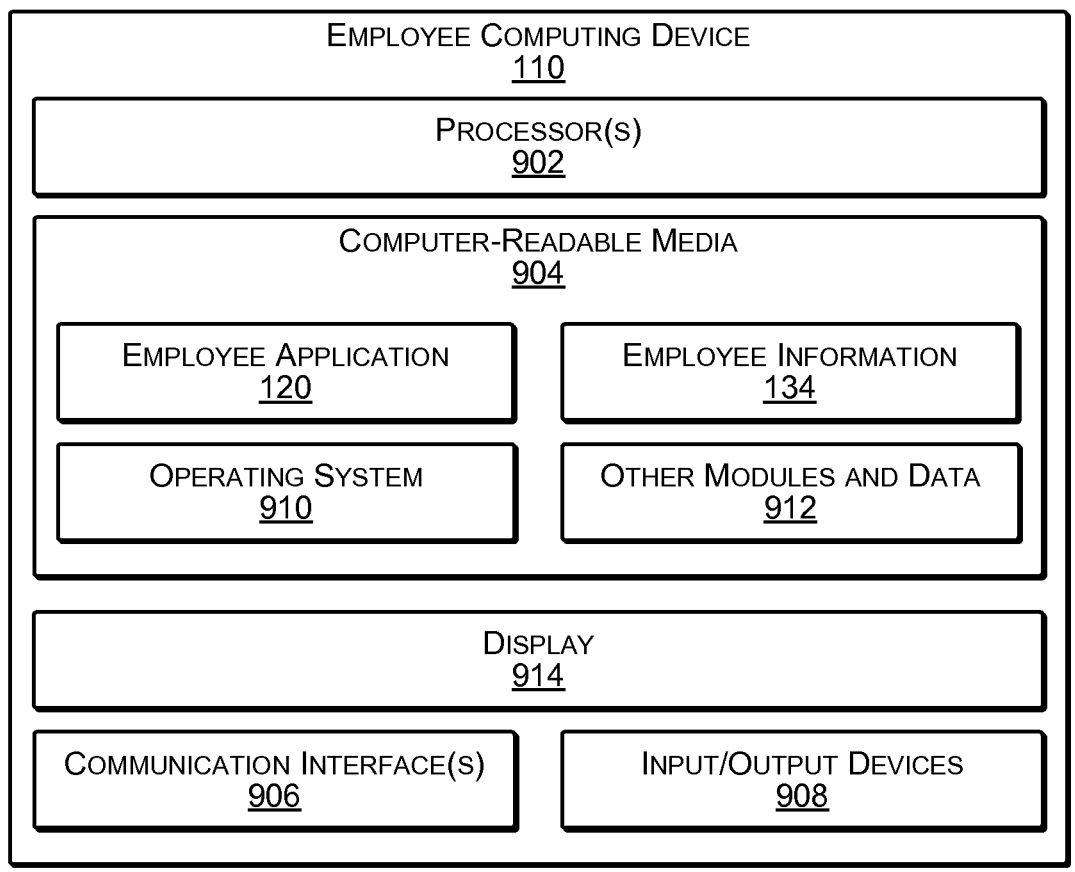
FIG. 9 illustrates select components of an example employee computing device according to some implementations.

FIG. 9 illustrates select example components of the employee computing device 110 that may implement the functionality described above according to some examples. The employee computing device 110 may be any of a number of different types of portable computing devices. Some examples of the employee computing device 110 may include smart phones and mobile communication devices; tablet computing devices; laptops, netbooks and other portable computers; wearable computing devices and/or body-mounted computing devices, which may include watches and augmented reality devices, such as helmets, goggles or glasses. Further, in some examples, the employer computing device may be a stationary or semi-stationary device, such as a desktop computer, work station, terminal, or any other computing device capable of sending communications and performing the functions according to the techniques described herein.

In the example of FIG. 9, the employee computing device 110 includes components such as at least one processor 902, one or more computer-readable media 904, the one or more communication interfaces 906, and one or more input/output (I/O) devices 908. Each processor 902 may itself comprise one or more processors or processing cores. For example, the processor 902 can be implemented as one or more microprocessors, microcomputers, microcontrollers, digital signal processors, central processing units, state machines, logic circuitries, and/or any devices that manipulate signals based on operational instructions. In some cases, the processor 902 may be one or more hardware processors and/or logic circuits of any suitable type specifically programmed or configured to execute the algorithms and processes described herein. The processor 902 can be configured to fetch and execute computer-readable processor-executable instructions stored in the computer-readable media 904.

Depending on the configuration of the employee computing device 110, the computer-readable media 904 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 904 may include, but is not limited to, RAM, ROM, EEPROM, flash memory, solid-state storage, magnetic disk storage, optical storage, and/or other computer-readable media technology. Further, in some cases, the employee computing device 110 may access external storage, such as RAID storage systems, storage arrays, network attached storage, storage area networks, cloud storage, or any other medium that can be used to store information and that can be accessed by the processor 902 directly or through another computing device or network. Accordingly, the computer-readable media 904 may be computer storage media able to store instructions, modules or components that may be executed by the processor 902. Further, when mentioned, non-transitory computer-readable media exclude media such as energy, carrier signals, electromagnetic waves, and signals per se.

The computer-readable media 904 may be used to store and maintain any number of functional components that are executable by the processor 902. In some implementations, these functional components comprise instructions or programs that are executable by the processor 902 and that, when executed, implement operational logic for performing the actions and services attributed above to the employee computing device 110. Functional components of the employee computing device 110 stored in the computer-readable media 904 may include the employee application 120, as discussed above. Additional functional components may include an operating system 910 for controlling and managing various functions of the employee computing device 110 and for enabling basic user interactions with the employee computing device 110.

In addition, the computer-readable media 904 may also store data, data structures and the like, that are used by the functional components. For example, the computer readable media 904 may include the employee information 134. Depending on the type of the employee computing device 110, the computer-readable media 904 may also optionally include other functional components and data, such as other modules and data 912, which may include applications, programs, drivers, etc., and the data used or generated by the functional components. Further, the employee computing device 110 may include many other logical, programmatic and physical components, of which those described are merely examples that are related to the discussion herein.

The communication interface(s) 906 may include one or more interfaces and hardware components for enabling communication with various other devices, such as over the network(s) 106 or directly. For example, communication interface(s) 906 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 9 further illustrates that the employee computing device 110 may include a display 914. Depending on the type of computing device used as the employee computing device 110, the display 914 may employ any suitable display technology. For example, the display 916 may be a liquid crystal display, a plasma display, a light emitting diode display, an OLED (organic light-emitting diode) display, an electronic paper display, or any other suitable type of display able to present digital content thereon. In some examples, the display 914 may have a touch sensor associated with the display 914 to provide a touchscreen display configured to receive touch inputs for enabling interaction with a graphic interface presented on the display 914. Accordingly, implementations herein are not limited to any particular display technology. Alternatively, in some examples, the employee computing device 110 may not include a display.

The employee computing device 110 may further include the one or more I/O devices 908. The I/O devices 908 may include speakers, a microphone, a camera, and various user controls (e.g., buttons, a joystick, a keyboard, a keypad, etc.), a haptic output device, and so forth. Additionally, the employee computing device 110 may include various other components that are not shown, examples of which include removable storage, a power source, such as a battery and power control unit, and so forth.

Various instructions, methods and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A system comprising:
one or more processors; and
one or more computer-readable media storing instructions executable by the one or more processors, wherein the instructions program the one or more processors to implement a service to:
receive from a first computing device associated with an employer, a communication including an indication to add employee information of an employee to a payroll of the employer to add the employee to the payroll of the employer, the communication including at least one of an email address or a telephone number associated with the employee;
send, via the at least one of the email address or the telephone number, a request for the employee information;
receive, from a second computing device, in response to the request, the employee information of the employee, wherein the employee information includes a tax payer identifier of the employee and tax withholding information for the employee, and wherein the second computing device is a computing device associated with the employee;
associate the employee information with an employee profile accessible with an employee authorization credential;
in response to receiving the indication from the first computing device and the employee information from the second computing device, associate the employee information with payroll information of the employer to add the employee to the payroll of the employer; and
send at least a portion of the employee information to the first computing device.

2. The system as recited in claim 1, wherein the instructions program the one or more processors to further implement the service to:
receive, in association with the employee authorization credential, a change to the employee information associated with the employee profile; and
update the employee information associated with the payroll information to include the change to the employee information.

3. The system as recited in claim 1, wherein the instructions program the one or more processors to further implement the service to:
receive, from a computing device of another employer, a request to associate the employee information with payroll information of the other employer;
send, using contact information associated with the employee profile, an electronic communication requesting authorization to associate the employee information with the payroll information of the other employer; and
in response to receiving the employee authorization credential, associate the employee information with the payroll information of the other employer.

4. The system as recited in claim 1, wherein the instructions program the one or more processors to further implement the service to:
store, in association with the employee profile, employment history information that includes present employer information including at least one of a start date, a termination date or job attendance information;

receive a request in association with the employee authorization credential to provide the employment history information to a prospective employer; and
send the employment history information based on contact information for the prospective employer.

5. A method comprising:
receiving, by a computing device associated with a service provider, employee information, the employee information including an employee name, a tax payer identifier of the employee, and tax withholding information for the employee;
associating the employee information with an employee profile;
receiving, at the service provider, an employee authorization of the employee to add the employee to the payroll of an employer by associating the employee information with payroll information associated with the employer; and
associating, at least partly in response to receiving the employee authorization, the employee information with the payroll information to add the employee to the payroll of the employer.

6. The method as recited in claim 5, further comprising:
receiving, in association with an employee authorization credential, a change to the employee information associated with the employee profile; and
updating the employee information associated with the payroll information to include the change.

7. The method as recited in claim 5, wherein receiving the employee authorization to associate the employee information with the payroll information associated with the employer further comprises receiving an authorization credential in association with the employee authorization, the authorization credential comprising at least one of a password associated with the employee, a shared secret associated with the employee, or biometric information associated with the employee.

8. The method as recited in claim 5, wherein receiving the employee information further comprises receiving at least one of:
a mailing address of the employee;
bank account information of the employee for receiving direct deposit payroll payments;
federal employment eligibility information of the employee;
a telephone number of the employee;
an email address of the employee; or
a date of birth of the employee.

9. The method as recited in claim 5, wherein receiving the tax withholding information includes receiving tax withholding exemption information for at least one of federal income tax or state income tax.

10. The method as recited in claim 5, further comprising:
receiving a request from another employer to associate the employee information with payroll information associated with the other employer; and
associating the employee information with the payroll information associated with the other employer.

11. The method as recited in claim 10, further comprising:
prior to associating the employee information with the payroll information associated with the other employer, sending an electronic communication using contact information associated with the employee profile, the electronic communication requesting authorization to associate the employee information in the employee profile with the payroll information associated with the other employer; and in response to the sending, receiving an employee authorization to associate the employee information with the payroll information associated with the other employer.

12. The method as recited in claim 5, further comprising:
receiving transaction information for a payment for goods or services, wherein the transaction information is associated with the employee; and
based at least in part on the transaction information and the payroll information associated with the employer, determining a payroll payment for the employee.

13. The method as recited in claim 12, further comprising in response to receiving the transaction information, sending payment authorization information for authorizing a payment instrument used as payment for the transaction.

14. The method as recited in claim 5, further comprising:
receiving a request to send an electronic version of a specified form, the electronic version of the specified form to include a portion of the employee information;
generating the electronic version of the specified form with the portion of the employee information added to the electronic version of the specified form; and
sending the electronic version of the specified form with an electronic communication in response to the request.

15. The method as recited in claim 5, further comprising:
adding, to employment history information of the employee, by the computing device of the service provider, information related to the employer, including at least one of a date the employee started working for the employer or contact information for the employer; and
in response to a request received in association with an employee authorization credential, sending the employment history to contact information associated with another employer.

16. One or more non-transitory computer-readable media maintaining instructions that, when executed by one or more processors, program the one or more processors to:
send, by a first computing device, to a second computing device associated with a service, an identifier of an employee and an indication to add the employee to a payroll of an employer by adding employee information of the employee previously maintained by the service with respect to a different employer to payroll information associated with the employer; and
in response to sending the identifier and the indication, receive at least a portion of the employee information associated with the payroll information associated with the employer.

17. The one or more non-transitory computer-readable media as recited in claim 16, wherein the instructions further program the one or more processors to send, to the second computing device, an authorization credential associated with the employee information to authorize associating the employee information with the payroll information associated with the employer.

18. The one or more non-transitory computer-readable media as recited in claim 16, wherein the instructions further program the one or more processors to:
present at least the portion of the employee information on a display associated with the first computing device; and
receive at least one of:
an employee authorization credential; or
an input indicating verification of the at least the portion of the employee information.

19. The one or more non-transitory computer-readable media as recited in claim 16, wherein the received portion of the employee information includes at least one of:
an electronic version of a tax withholding exemption form for state or federal income tax including employee information added to the form;
employee information indicating tax withholding exemption information for the employee for at least one of state income tax or federal income tax;
an electronic version of an employment eligibility form including employee information added to the form; or
employee information for the employment eligibility form.

20. The one or more non-transitory computer-readable media as recited in claim 16, wherein the instructions further program the one or more processors to:
determine that the employee has been employed by the employer for a specified period of time and is due to receive a payroll payment; and
send the identifier and the indication in response to determining that the employee is due to receive the payroll payment.

21. The one or more non-transitory computer-readable media as recited in claim 16, wherein the instructions further program the one or more processors to:
receive log in information associated with the employee;
receive transaction information for a sale of a good or service conducted in association with the log in information, the transaction information including payment instrument information;
send the transaction information to the second computing device in association with the log in information associated with the employee; and
in response to sending the transaction information, receive authorization of the payment instrument as payment for the good or service.

22. A method comprising:
presenting, by a first computing device, a user interface to receive employee information, the employee information including a tax payer identifier of an employee and tax withholding information for the employee;
sending the employee information to a second computing device associated with a service provider to include the employee information in an employee profile;
receiving a request for authorization to add the employee to a payroll of an employer by adding the employee information to payroll information of the employer; and
providing an employee authorization of the employee to the service provider to authorize adding the employee to the payroll of the employer by associating the employee information with the payroll information of the employer.

23. The method as recited in claim 22, wherein providing the employee authorization further comprises providing at least one of:
a password associated with the employee;
a shared secret associated with the employee; or
biometric information associated with the employee.

24. The method as recited in claim 22, further comprising:
receiving a request to associate the employee information with payroll information of another employer; and
sending an employee authorization to authorize associating the employee information with the payroll information of the other employer.

25. The method as recited in claim 22, further comprising:
sending the employee authorization for accessing the employee information in the employee profile;
making a change to a portion of the employee information; and
sending an indication to save the change to the employee profile.

26. The method as recited in claim 22, further comprising, following presenting the user interface to receive the employee information, receiving, via the user interface, employee information comprising at least one of:
- a name of the employee;
- a mailing address of the employee;
- the taxpayer identifier of the employee;
- bank account information of the employee for receiving direct deposit payroll payments;
- federal employment eligibility information of the employee;
- a number of income tax withholding exemptions for the employee; or
- a date of birth of the employee.

* * * * *